(12) United States Patent
Matsusue

(10) Patent No.: US 11,462,755 B2
(45) Date of Patent: Oct. 4, 2022

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 20 days.

(21) Appl. No.: 17/231,178

(22) Filed: Apr. 15, 2021

(65) Prior Publication Data

US 2021/0336283 A1 Oct. 28, 2021

(30) Foreign Application Priority Data

Apr. 24, 2020 (JP) .............................. JP2020-077464

(51) Int. Cl.
| | |
|---|---|
| *H01M 8/04* | (2016.01) |
| *H01M 8/04746* | (2016.01) |
| *H01M 8/04089* | (2016.01) |
| *H01M 8/04858* | (2016.01) |
| *H01M 8/04701* | (2016.01) |

(52) U.S. Cl.
CPC ............ *H01M 8/04753* (2013.01); *H01M 8/04089* (2013.01); *H01M 8/0494* (2013.01); *H01M 8/04708* (2013.01); *H01M 2250/20* (2013.01)

(58) Field of Classification Search
CPC ......... H01M 8/04753; H01M 8/04089; H01M 8/04708; H01M 8/0494; H01M 2250/20
USPC ........................................................ 429/444
See application file for complete search history.

(56) References Cited

U.S. PATENT DOCUMENTS

| | | | |
|---|---|---|---|
| 2003/0180599 A1 | 9/2003 | Kamihara | |
| 2014/0080018 A1* | 3/2014 | Ohgami | H01M 8/04097 429/444 |
| 2014/0212780 A1* | 7/2014 | Furusawa | H01M 8/04388 429/429 |
| 2017/0250416 A1* | 8/2017 | Watanabe | H01M 8/04835 |
| 2017/0346117 A1* | 11/2017 | Ojima | H01M 8/04228 |
| 2018/0034087 A1* | 2/2018 | Watanabe | H01M 8/04014 |
| 2020/0127309 A1* | 4/2020 | Sakai | H01M 8/04947 |

FOREIGN PATENT DOCUMENTS

| | | |
|---|---|---|
| JP | 2003-151593 A | 5/2003 |
| JP | 2007-242476 A | 9/2007 |

* cited by examiner

*Primary Examiner* — James M Erwin
(74) *Attorney, Agent, or Firm* — Finnegan, Henderson, Farabow, Garrett & Dunner, LLP

(57) ABSTRACT

To provide a fuel cell system configured to reduce the drying of the inside of the fuel cell stack and increase the power generation performance of the fuel cell stack by reducing a circulation gas flow rate during high temperature operation. Disclosed is a fuel cell system comprising: a fuel cell stack, an ejector, a first injector which supplies fuel gas to the ejector, a second injector which has a smaller fuel gas injection amount than the first injector and which supplies the fuel gas to the ejector, a third injector which supplies the fuel gas to fuel electrodes of the fuel cell stack, a fuel gas supplier, a first supply flow path, a second supply flow path which enables the supply of the fuel gas from the third injector to the fuel electrodes of the fuel cell stack, a circulation flow path, a temperature detector, and a controller.

2 Claims, 2 Drawing Sheets

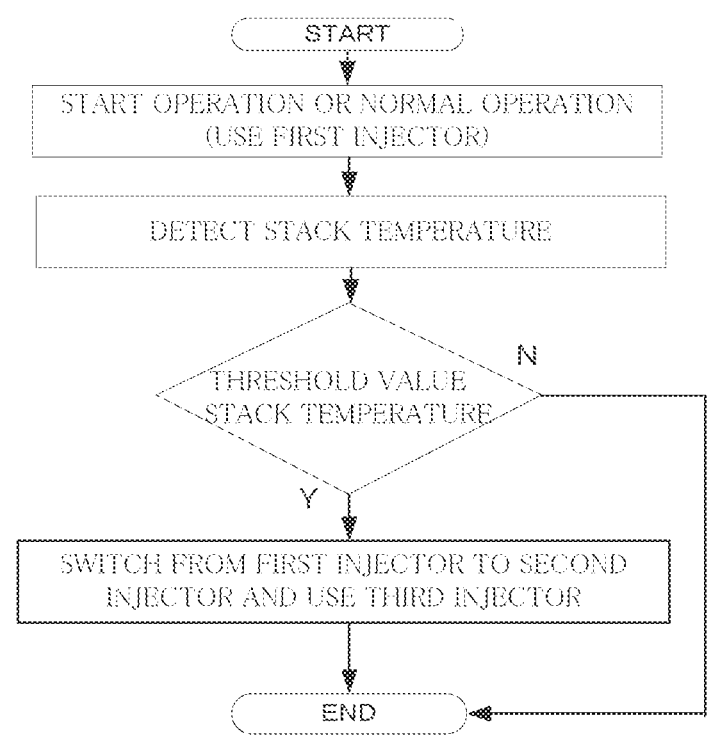

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H_+$) conductivity (hereinafter, it may be simply referred to as "electrolyte membrane").

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

A fuel cell system is required to include a fuel cell in which fuel off-gas containing redundant fuel from a fuel electrode, is circulated on a fuel supply side and excellent fuel circulation is ensured in an overall operation range of from low load to high load.

For example, Patent Literature 1 discloses a fuel cell system which is equipped with an ejector bypass line and a controller for controlling the degree of opening and which controls them depending on an operation load condition.

Patent Literature 2 discloses a fuel cell system including a bypass passage and a buffer tank arranged in the bypass passage.

Patent Literature 1: Japanese Patent Application Laid-Open (JP-A) No. 2003-151593

Patent Literature 2: JP-A No. 2007-242476

During high temperature operation of the stack, water vapor contained in anode off-gas (water vapor removed from the stack) increases. Meanwhile, during high temperature operation, it is needed to reduce the drying of the inside of the stack. Accordingly, during high temperature operation, it is needed to reduce the flow rate of the anode off-gas discharged from the stack to the outside of the system. Even in the case of a fuel cell system including a circulation flow path for circulating anode off-gas, water vapor is discharged from the stack and condenses in a gas-liquid separator installed in the circulation flow path, in the circulation flow path at a lower temperature than the temperature of the inside of the stack, etc. Accordingly, the whole water vapor contained in the anode off-gas cannot return to the stack as circulation gas. As a result, the drying of the inside of the stack tends to proceed.

For the fuel cell system of Patent Literature 1, the circulation gas flow rate can be decreased by introducing fuel gas from the ejector bypass line to the stack and using a backflow phenomenon to the ejector, which is due to a high pressure loss at the inlet of the stack. Accordingly, it is possible to reduce the amount of the water vapor removed from the stack. However, the flow rate of the circulation gas supplied from the ejector to the stack, is not taken into account, and it is sometimes difficult to reduce the amount of, based on an increase in the stack temperature which is associated with an increase in load, the water vapor removed from the stack.

The fuel cell system of the Patent Literature 2 can reduce an increase in the pressure on the ejector outlet side. However, in the case of using such a fuel cell system as the power source of a fuel cell vehicle (hereinafter, it may be referred to as "vehicle"), etc., a response to the power which is required depending on the operational state of the vehicle, may be insufficient.

SUMMARY

The disclosed embodiments were achieved in light of the above circumstances. An object of the disclosed embodiments is to provide the fuel cell system configured to reduce the drying of the inside of the fuel cell stack and increase the power generation performance of the fuel cell stack by reducing the circulation gas flow rate (that is, the amount of the water vapor removed from the fuel cell stack) during high temperature operation.

In a first embodiment, there is provided a fuel cell system comprising:

a fuel cell stack, an ejector, an injector set including a first injector which supplies fuel gas to the ejector and a second injector which is disposed in parallel with the first injector, which has a smaller fuel gas injection amount than the first injector, and which supplies the fuel gas to the ejector, a third injector which supplies the fuel gas to fuel electrodes of the fuel cell stack, a fuel gas supplier which supplies the fuel gas to the first, second and third injectors, a first supply flow path which connects the fuel gas supplier, the injector set, the ejector and the fuel cell stack in this order, a second supply flow path which branches off in a region between the fuel gas supplier and injector set of the first supply flow path, bypasses the injector set and the ejector, and joins the first supply flow path at a downstream position of the ejector to enable the supply of the fuel gas from the third injector to the fuel electrodes of the fuel cell stack, a circulation flow path which recovers fuel off-gas discharged from the fuel electrodes of the fuel cell stack and returns the fuel off-gas as circulation gas to the ejector, a temperature detector which detects a temperature of the fuel cell stack, and a controller, wherein the ejector supplies mixed gas containing the fuel gas and the circulation gas to the fuel electrodes of the fuel cell stack, and wherein, in the case where the temperature of the fuel cell stack detected by the temperature detector exceeds a predetermined threshold value, the controller switches from the first injector to the second injector and supplies the fuel gas to the ejector, and the controller supplies the fuel gas from the third injector to the fuel electrodes of the fuel cell stack.

In the case where the temperature of the fuel cell stack detected by the temperature detector is the predetermined threshold value or less, the controller may supply the fuel gas from the first injector to the ejector, and the controller may stop the supply of the fuel gas from the second injector to the ejector and from the third injector to the fuel electrodes of the fuel cell stack.

According to the disclosed embodiments, the fuel cell system configured to reduce the drying of the inside of the fuel cell stack and increase the power generation performance of the fuel cell stack by reducing the circulation gas flow rate during high temperature operation, can be provided.

BRIEF DESCRIPTION OF THE DRAWINGS

In the accompanying drawings,

FIG. 2 is the flow chart of an example of the method for controlling the fuel cell system according to the disclosed embodiments.

DETAILED DESCRIPTION

Figure 1:
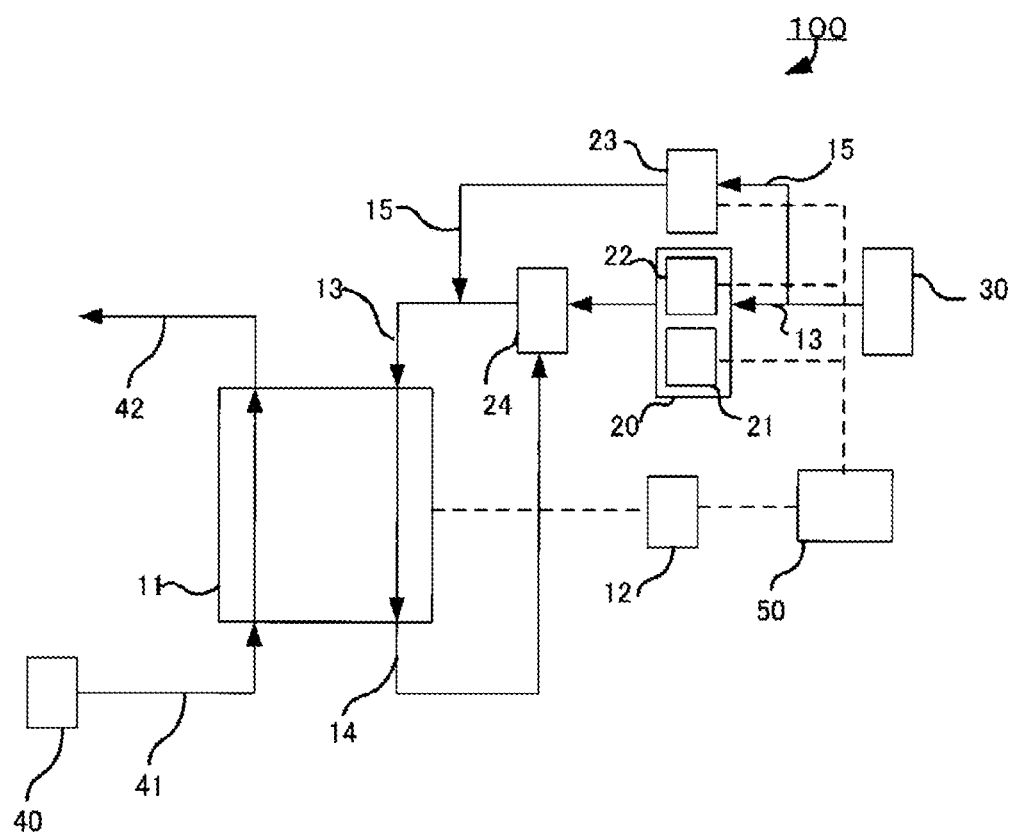
FIG. 1 is a schematic configuration diagram of an example of the fuel cell system according to the disclosed embodiments.

The fuel cell system of the disclosed embodiments is a fuel cell system comprising:
a fuel cell stack,
an ejector,
an injector set including a first injector which supplies fuel gas to the ejector and a second injector which is disposed in parallel with the first injector, which has a smaller fuel gas injection amount than the first injector, and which supplies the fuel gas to the ejector,
a third injector which supplies the fuel gas to fuel electrodes of the fuel cell stack,
a fuel gas supplier which supplies the fuel gas to the first, second and third injectors,
a first supply flow path which connects the fuel gas supplier, the injector set, the ejector and the fuel cell stack in this order,
a second supply flow path which branches off in a region between the fuel gas supplier and injector set of the first supply flow path, bypasses the injector set and the ejector, and joins the first supply flow path at a downstream position of the ejector to enable the supply of the fuel gas from the third injector to the fuel electrodes of the fuel cell stack,
a circulation flow path which recovers fuel off-gas discharged from the fuel electrodes of the fuel cell stack and returns the fuel off-gas as circulation gas to the ejector,
a temperature detector which detects a temperature of the fuel cell stack, and
a controller,
wherein the ejector supplies mixed gas containing the fuel gas and the circulation gas to the fuel electrodes of the fuel cell stack, and
wherein, in the case where the temperature of the fuel cell stack detected by the temperature detector exceeds a predetermined threshold value, the controller switches from the first injector to the second injector and supplies the fuel gas to the ejector, and the controller supplies the fuel gas from the third injector to the fuel electrodes of the fuel cell stack.

The fuel cell system of the disclosed embodiments includes the circulation path and the injectors that are different in fuel gas injection amount. During high temperature operation of the system, fuel gas is supplied from the second supply flow path (an ejector bypass flow path) to the stack, and fuel gas is supplied from the second injector having a small fuel gas injection amount to the ejector, thereby reducing the circulation gas flow rate, that is, the amount of water vapor removed from the stack.

According to the disclosed embodiments, by using both the ejector and the ejector bypass flow path during high temperature operation, the force to cause the fuel gas to flow back from the ejector bypass flow path to the circulation gas injection nozzle side of the ejector, is exerted. As a result, the circulation flow rate can be reduced.

During high temperature operation, if the flow rate of the fuel gas supplied to the ejector is decreased and the circulation gas flow rate is decreased without using the ejector bypass flow path, the performance of the stack may be decreased by an increase in anode overvoltage.

Meanwhile, by using the ejector bypass flow path, the flow rate of the circulation gas supplied to the stack can be decreased with increasing the flow rate of the fuel gas supplied to the stack.

As the high temperature operation, examples include, but are not limited to, the following operations that put more emphasis on secure power output than on fuel efficiency: uphill driving of a vehicle in which the fuel cell system of the disclosed embodiments is installed, and driving the vehicle with towing another vehicle.

FIG. 1 is a schematic configuration diagram of an example of the fuel cell system according to the disclosed embodiments A fuel cell system 100 shown in FIG. 1 includes the following: a fuel cell stack 11; a temperature detector 12; a first supply flow path 13; a circulation flow path 14; a second supply flow path 15; an injector set 20 which includes a first injector 21 and a second injector 22 in parallel; a third injector 23; an ejector 24; a fuel gas supplier 30; an oxidant gas supplier 40; an oxidant gas supply flow path 41; an oxidant gas discharge flow path 42; and a controller 50.

The temperature detector 12, the first injector 21, the second injector 22 and the third injector 23 are electrically connected with the controller 50. The controller 50 obtains the temperature of the fuel cell stack 11 detected by the temperature detector 12. Based on the temperature, the controller 50 controls the first injector 21, the second injector 22 and the third injector 23.

The fuel cell system of the disclosed embodiments includes at least the fuel cell stack, the temperature detector, the first supply flow path, the circulation flow path, the second supply flow path, the injector set including the first injector and the second injector in parallel, the third injector, the ejector, the fuel gas supplier and the controller. In general, the fuel cell system further includes an oxidant gas supplier, an oxidant gas supply flow path, an oxidant gas discharge flow path, a cooling water supplier, a cooling water circulation flow path, etc.

In general, the fuel cell system of the disclosed embodiments is installed and used in a fuel cell vehicle that uses a motor as a driving source.

The motor is not particularly limited. It may be a conventionally-known motor.

The fuel cell stack may supply power to the motor.

The fuel cell stack is composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a cooling water flow path for keeping the temperature of the fuel cell stack at a constant level.

The separators may have supply and discharge holes for delivering reaction gas and cooling water in the unit cell stacking direction.

As the supply hole, examples include, but are not limited to, a fuel gas supply hole, an oxidant gas supply hole and a cooling water supply hole.

As the discharge hole, example include, but are not limited to, a fuel gas discharge hole, an oxidant gas discharge hole and a cooling water discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

The fuel cell stack may have a manifold such as an inlet manifold communicating between supply holes and an outlet manifold communicating between discharge holes.

As the inlet manifold, examples include, but are not limited to, an anode inlet manifold, a cathode inlet manifold and a cooling water inlet manifold.

As the outlet manifold, examples include, but are not limited to, an anode outlet manifold, a cathode outlet manifold and a cooling water outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The temperature detector detects the temperature of the fuel cell stack. The temperature of the fuel cell stack may be the temperature of cooling water circulating in and out of the fuel cell stack. Also, the temperature of the fuel cell stack may be the temperature of cooling water flowing around the cooling water inlet of the fuel cell stack, or it may be the temperature of cooling water flowing around the cooling water outlet of the fuel cell stack.

As the temperature detector, examples include, but are not limited to, a temperature sensor.

The first supply flow path connects the fuel gas supplier, the injector set, the ejector and the fuel cell stack in this order.

The first supply flow path connects the fuel gas supplier and the injector set to enable the supply of the fuel gas from the fuel gas supplier to the first and second injectors of the injector set. Also, the first supply flow path connects the injector set and the ejector to enable the supply of the fuel gas from the injector set to the ejector. Also, the first supply flow path connects the ejector and a fuel-based gas inlet (e.g., the anode inlet manifold) of the fuel cell stack to enable the supply of the mixed gas from the ejector to the fuel electrodes of the fuel cell stack. The fuel-based gas encompasses fuel gas and mixed gas containing fuel gas and circulation gas.

The second supply flow path branches off at a downstream position of the fuel gas supplier of the first supply flow path, that is, in the region between the fuel gas supplier and injector set of the first supply flow path, bypasses the injector set and the ejector, and joins the first supply flow path at a downstream position of the ejector to enable the supply of the fuel gas from the third injector to the fuel electrodes of the fuel cell stack. Accordingly, the second supply flow path connects the fuel gas supplier and the third injector to enable the supply of the fuel gas from the fuel gas supplier to the third injector.

The second supply flow path is an ejector bypass flow path that bypasses the ejector to enable direct supply of the fuel gas to the fuel cell stack.

The circulation flow path enables that it connects the fuel off-gas discharge hole (e.g., the anode outlet manifold) of the fuel cell stack with the ejector, recovers the fuel off-gas discharged from the fuel electrodes of the fuel cell stack, and returns the fuel off-gas as the circulation gas to the ejector.

The fuel off-gas mainly contains fuel gas, which passed through the fuel electrodes while remaining unreacted, and moisture, which is water generated at the oxidant electrodes and delivered to the fuel electrodes.

A gas-liquid separator may be installed in the circulation flow path, which is used for the removal of condensed water generated by cooling the water vapor of the fuel off-gas in the circulation flow path. Also, a drain flow path, which branches off from the circulation flow path by the gas-liquid separator, may be installed in the circulation flow path, and a drain valve may be installed in the drain flow path.

In the gas-liquid separator, the removed condensed water may be discharged by opening the drain valve of the drain flow path branching off from the circulation flow path.

Also, the circulation flow path may be provided with a circulation pump for efficient supply of the circulation gas to the ejector.

The ejector supplies the mixed gas containing the fuel gas and the circulation gas to the fuel electrodes of the fuel cell stack. As the ejector, a conventionally-known ejector may be used.

The injector set includes the first injector and the second injector in parallel.

The first injector supplies the fuel gas to the ejector.

The second injector is disposed in parallel with the first injector, has a smaller fuel gas injection amount than the first injector, and supplies the fuel gas to the elector.

The fuel gas injection amount of the second injector is not particularly limited, as long as it is smaller than the first injector.

The injectors of the injector set are electrically connected with the controller. The use of any one of the injectors of the injector set may be enabled by a signal from the controller. To switch the used injector of the injector set, the injector set may be provided with an injector switching valve. The switching valve may be electrically connected with the controller, and the used injector may be switched by controlling the switching valve by a signal from the controller.

The third injector is disposed on the second supply flow path, separately from the injector set, and it directly supplies the fuel gas to fuel electrodes of the fuel cell stack.

The fuel gas injection amount of the third injector is not particularly limited, and it may be smaller than the first injector. Also, the fuel gas injection amount of the third injector may be larger than, may be smaller than, or may be equal to the fuel gas injection amount of the second injector. From the viewpoint of reducing the circulation flow rate, the fuel gas injection amount of the third injector may be larger than the fuel gas injection amount of the second injector.

In general, the second supply flow path joins the first supply flow path at a downstream position of the ejector, and the pressure loss around the fuel-based gas inlet (e.g., the anode inlet manifold) of the stack is larger than the pressure loss of the first supply flow path. Accordingly, part of the fuel gas supplied from the third injector to the fuel cell stack, flows back through the first supply flow path and reduces the supply of the mixed gas from the ejector to the fuel cell stack. As a result, the circulation gas flow rate is decreased, and the amount of the water vapor removed by the anode off-gas discharged from the fuel cell stack, is reduced.

By using the third injector in combination with the second injector having a smaller fuel gas injection amount than the first injector, an increase in the anode overvoltage is reduced, and a decrease in the stack performance is reduced.

The third injector may be electrically connected with the controller to turn on and off the start-up switch of the third injector by the controller.

The fuel gas supplier supplies the fuel gas to the first, second and third injectors.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel gas supplier may be electrically connected with the controller to control the fuel gas supplying injectors by a signal from the controller. Also, a control valve for controlling the fuel gas supply to the third injector may be disposed at an upstream position of the third injector on the second supply flow path. The control valve may be electrically connected with the controller to control the fuel gas supply from the fuel gas supplier to the third injector by controlling the opening and closing of the control valve by a signal from the controller.

The fuel cell system may include the oxidant gas supplier, the oxidant gas supply flow path, and the oxidant gas discharge flow path.

The oxidant gas supplier supplies oxidant gas to at least the oxidant electrodes of the fuel cell stack.

As the oxidant gas supplier, for example, an air compressor may be used. The air compressor is driven by a control signal from the controller and introduces the oxidant gas to the cathode side (such as the oxidant electrode and the cathode inlet manifold) of the fuel cell.

The oxidant gas supply flow path enables that it connects the oxidant gas supplier with the fuel cell stack and supplies oxidant gas from the oxidant gas supplier to the oxidant electrodes of the fuel cell stack.

The oxidant gas is oxygen-containing gas. It may be air, dry air, pure oxygen or the like.

The oxidant gas discharge flow path enables the discharge of the oxidant gas from the oxidant electrodes of the fuel cell stack.

The fuel cell system may include a cooling water supplier and a cooling water circulation flow path.

The cooling water circulation flow path enables that it communicates between the cooling water inlet manifold and cooling water outlet manifold installed in the fuel cell stack, circulates the cooling water supplied from the cooling water supplier in and out of the fuel cell stack, and cools down the fuel cell stack.

As the cooling water supplier, examples include, but are not limited to, a cooling water pump.

As the cooling water (refrigerant), for example, a mixed solution of ethylene glycol and water may be used to prevent freezing at low temperatures.

The fuel cell system may include a fuel off-gas discharger.

The fuel off-gas discharger may discharge the fuel off-gas, in which the concentration of the fuel gas is the predetermined concentration or less, to the outside. The outside means the outside of the fuel cell system.

The fuel off-gas discharger may include a fuel off-gas discharge valve. As needed, it may further include a fuel off-gas discharge flow path.

The fuel off-gas discharge valve controls the fuel off-gas discharge flow amount.

The fuel off-gas discharge flow path may branch off from the circulation flow path.

The fuel off-gas discharger may discharge the fuel off-gas to the outside when, for example, the concentration of the fuel gas such as hydrogen in the fuel off-gas is the predetermined concentration or less. The predetermined concentration of the fuel gas is not particularly limited and may be appropriately determined considering the fuel efficiency of the fuel cell system, for example.

The method for detecting the concentration of the fuel gas in the fuel off-gas is not particularly limited. For example, a conventionally-known concentration sensor may be used.

The controller controls the fuel cell system.

The controller may be connected with the temperature detector, the injector set, the third injector, the fuel gas supplier, the fuel off-gas discharger, the oxidant gas supplier and so on through an input-output interface.

The controller makes a judgement on whether or not the temperature of the fuel cell stack detected by the temperature detector exceeds the predetermined threshold value. Also, the controller switches the used injector of the injector set, controls the turning on and off of the start-up switch of the third injector, etc.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

FIG. 2 is the flow chart of an example of the method for controlling the fuel cell system according to the disclosed embodiments. The disclosed embodiments are not limited to this typical example.

In the control method shown in FIG. 2, first, at the time of starting the operation of the fuel cell stack or during the normal operation the fuel cell stack, the controller supplies the fuel gas from the first injector to the ejector, and it supplies the mixed gas to the fuel electrodes of the fuel cell stack by using the ejector.

Next, the temperature detector detects the temperature of the fuel cell stack.

Then, in the case where the detected temperature of the fuel cell stack is the predetermined threshold value or less, the controller terminates the control.

On the other hand, in the case where the detected fuel cell stack temperature exceeds the predetermined threshold value, the controller switches from the first injector to the second injector and supplies the fuel gas to the ejector, and the controller starts up the third injector and supplies the fuel gas from the third injector to the fuel electrodes of the fuel cell stack. Then, the controller terminates the control.

(1) Detection of the Fuel Cell Stack Temperature

The temperature detector detects the temperature of the fuel cell stack at predetermined times.

The method for detecting the temperature of the fuel cell stack is not particularly limited. For example, it may be detected by installing a conventionally-known temperature sensor in the fuel cell system and detecting the temperature of the fuel cell stack (e.g., the temperature of cooling water around the cooling water inlet (such as the cooling water inlet manifold) of the fuel cell stack) by using the temperature sensor.

The timing for detecting the temperature of the fuel cell stack is not particularly limited. The temperature may be detected every time a predetermined time elapses after the operation of the fuel cell stack is started; it may be detected when the operation of the fuel cell stack is started; or it may be constantly detected. The detection time may be appropriately determined.

(2) Judgement on Whether or not the Temperature of the Fuel Cell Stack Exceeds the Predetermined Threshold Value The controller judges whether or not the temperature of the fuel cell stack detected by the temperature detector exceeds the predetermined threshold value.

The threshold value of the temperature of the fuel cell stack can be appropriately determined as follows, for example: data group showing a correlation between the temperature of the fuel cell stack and the power generation performance of the fuel cell stack, are prepared in advance by an experiment, etc., and the threshold value of the temperature of the fuel cell stack is appropriately determined by the performance, etc., of the fuel cell stack obtained from the data group.

(3) Control of the Circulation Gas Flow Rate (3-1) The Case where the Temperature of the Fuel Cell Stack Exceeds the Predetermined Threshold Value In the case where the temperature of the fuel cell stack detected by the temperature detector exceeds the predetermined threshold value, the controller switches from the first injector to the second injector and supplies the fuel gas to the ejector; using the ejector, the controller supplies the mixed gas to the fuel electrodes of the fuel cell stack; and the controller starts up the third injector and supplies the fuel gas from the third injector to the fuel electrodes of the fuel cell stack. Then, the controller terminates the control.

Accordingly, the circulation gas flow rate can be decreased during high temperature operation of the fuel cell stack. As a result, the drying of the inside of the fuel cell stack can be reduced, and the power generation performance of the fuel cell stack can be increased.

(3-2) The Case where the Temperature of the Fuel Cell Stack is the Predetermined Threshold Value or Less At the time of starting the operation of the fuel cell stack and during the normal operation of the fuel cell stack, the controller supplies the fuel gas from the first injector to the ejector, and the controller does not supply the fuel gas from the second injector to the ejector and from the third injector to the fuel electrodes of the fuel cell stack.

Accordingly, in the case where the temperature of the fuel cell stack is the predetermined threshold value or less, and in the case where the controller supplies the fuel gas from the first injector to the ejector, the controller may terminate the control.

Also, even in the case where the temperature of the fuel cell stack is the predetermined threshold value or less, if the controller supplies the fuel gas from the second injector to the ejector and from the third injector to the fuel electrodes of the fuel cell stack, the controller switches from the second injector to the first injector and supplies the fuel gas to the ejector, and the controller stops the third injector to stop the fuel gas supply from the third injector to the fuel electrodes of the fuel cell stack. Then, the controller may terminate the control.

The time to start the second and subsequent controls after the termination of the first control by the controller, is not particularly limited. They may be carried out at a predetermined time interval, and the time can be appropriately determined.

REFERENCE SIGNS LIST

11. Fuel cell stack
12. Temperature detector
13. First supply flow path
14. Circulation flow path
15. Second supply flow path
20. Injector set
21. First injector
22. Second injector
23. Third injector
24. Ejector
30. Fuel gas supplier
40. Oxidant gas supplier
41. Oxidant gas supply flow path
42. Oxidant gas discharge flow path
50. Controller
100. Fuel cell system

The invention claimed is:

1. A fuel cell system comprising:
a fuel cell stack,
an ejector,
an injector set including a first injector which supplies fuel gas to the ejector and a second injector which is disposed in parallel with the first injector, which has a smaller fuel gas injection amount than the first injector, and which supplies the fuel gas to the ejector,
a third injector which supplies the fuel gas to fuel electrodes of the fuel cell stack,
a fuel gas supplier which supplies the fuel gas to the first, second and third injectors,
a first supply flow path which connects the fuel gas supplier, the injector set, the ejector and the fuel cell stack in this order,
a second supply flow path which branches off in a region between the fuel gas supplier and injector set of the first supply flow path, bypasses the injector set and the ejector, and joins the first supply flow path at a downstream position of the ejector to enable the supply of the fuel gas from the third injector to the fuel electrodes of the fuel cell stack,
a circulation flow path which recovers fuel off-gas discharged from the fuel electrodes of the fuel cell stack and returns the fuel off-gas as circulation gas to the ejector,
a temperature detector which detects a temperature of the fuel cell stack, and
a controller,
wherein the ejector supplies mixed gas containing the fuel gas and the circulation gas to the fuel electrodes of the fuel cell stack, and
wherein, in the case where the temperature of the fuel cell stack detected by the temperature detector exceeds a predetermined threshold value, the controller switches from the first injector to the second injector and supplies the fuel gas to the ejector, and the controller supplies the fuel gas from the third injector to the fuel electrodes of the fuel cell stack.

2. The fuel cell system according to claim 1, wherein, in the case where the temperature of the fuel cell stack detected by the temperature detector is the predetermined threshold value or less, the controller supplies the fuel gas from the first injector to the ejector, and the controller stops the supply of the fuel gas from the second injector to the ejector and from the third injector to the fuel electrodes of the fuel cell stack.

* * * * *